(12) United States Patent
Geigel (10) Patent No.: US 9,984,066 B2
(45) Date of Patent: May 29, 2018

(54) METHOD AND SYSTEM OF EXTRACTING PATENT FEATURES FOR COMPARISON AND TO DETERMINE SIMILARITIES, NOVELTY AND OBVIOUSNESS

(71) Applicant: Arturo Geigel, Bayamón, PR (US)

(72) Inventor: Arturo Geigel, Bayamón, PR (US)

( * ) Notice: Subject to any disclaimer, the term of this patent is extended or adjusted under 35 U.S.C. 154(b) by 211 days.

(21) Appl. No.: 14/577,462

(22) Filed: Dec. 19, 2014

(65) Prior Publication Data
US 2015/0178272 A1    Jun. 25, 2015

Related U.S. Application Data

(60) Provisional application No. 61/918,181, filed on Dec. 19, 2013.

(51) Int. Cl.
*G06F 17/27*    (2006.01)
*G06F 17/28*    (2006.01)
*G06F 17/30*    (2006.01)

(52) U.S. Cl.
CPC ...... *G06F 17/2785* (2013.01); *G06F 17/2705* (2013.01); *G06F 17/30705* (2013.01)

(58) Field of Classification Search
CPC ........... G06F 17/2785; G06F 17/30705; G06F 17/2705
See application file for complete search history.

(56) References Cited

U.S. PATENT DOCUMENTS

2004/0243557 A1* 12/2004 Broder ................ G06F 17/2785
2011/0270826 A1* 11/2011 Cha .................. G06F 17/30011
707/723

\* cited by examiner

*Primary Examiner* — Qian Yang
(74) *Attorney, Agent, or Firm* — Eugenio J. Torres-Oyola; Victor Rodriguez-Reyes; Ferraiuoli LLC (57) ABSTRACT

An automated system that extract relevant structural and functional features from a patent document and carries out operations on patent documents to determine degree of overlap. The degree of overlap can then be used by the system to determine novelty and obviousness of a patent document.

20 Claims, 10 Drawing Sheets

METHOD AND SYSTEM OF EXTRACTING PATENT FEATURES FOR COMPARISON AND TO DETERMINE SIMILARITIES, NOVELTY AND OBVIOUSNESS

STATEMENT REGARDING FEDERALLY SPONSORED RESEARCH AND DEVELOPMENT

N/A

RELATED APPLICATIONS

N/A

BACKGROUND OF THE INVENTION

Field of the Invention

The invention relates to the field of semantic networks specifically relating to extracting syntactic and semantic content to derive a semantic network from a patent and carrying out a comparison between established patent documents and one or more patent submissions that require validation of claims. The process and method described herein establishes the process from which to extract relevant syntactic and semantic relationships to establish a difference in graph nodes between patents and patent applications.

Discussion of the Background

The present invention relates to the field of analytics, in particular to patent overlap identification and analysis or more precisely the obviousness in comparing a new submission with prior art.

Modern evaluation methods in this area perform analysis based on Boolean, vector space models, probabilistic models, latent semantic models, etc. These metrics abstract much of the relationships inherent in natural language narrative and leave the resulting score devoid elements and relationships that take advantage of the doctrine: "function follows form". This methodology can be applied in idea conceptualization, patent analysis and infringement analysis. While previous art has tried to exploit to some extent such principle they only apply it to one level of analysis and leave multiple levels of analysis to explore. Function follows form in the context of patent narrative is the process of going from an abstract concept to a concrete invention description where the inventors role is to organize disparate ideas into a coherent functional or descriptive concept by providing "bindings" of unrelated concepts through union of a coherent relationships at different levels of abstractions. This concept is integrated into the "restricted" narrative order and format of a patent which has additional form that provides the functionality of a patent document which the examiner uses to evaluate the proposed invention. This second level of function follows form materializes through section restriction, order of presentation, and restriction of syntax. By analyzing these two levels of "function follows form" in patent documents, one can arrive at a useful method of analysis that can in turn be reduced to a method and processes of analysis that can be implemented in a computerized system. This method and process become analogous to the principles on which examiners analyze the obviousness of the patent in relation to another. The resulting method and process in a computerized system can in turn help attorneys, patent examiners, agents and interested parties in evaluating obviousness in a patent as well as the possibility of determining infringement of a patent.

The prior art can be established in one of several categories. The first category establishes statistical processes (frequency of words) to discriminate relevance of prior art and establish if a submission is similar in content. This category may establish, basic statistical mechanisms, weighted scores, statistical co-occurrences and latent semantic analysis among other techniques to establish relevance. (U.S. Pat. No. 8,060,505 B2; U.S. 2008/0195568 A1; U.S. 2008/0235220 A1; U.S. 2013/0132154 A1; U.S. 2013/0124515 A1; U.S. 2008/0288489 A1; U.S. 2010/0114587 A1).

The second category pertains in clustering and network analysis on established criteria to try to differentiate previous work from new work (U.S. Pat. No. 8,412,659 B2). A node structure of elements is shown in U.S. Pat. No. 8,423,489 B2. A related field is by analyzing patent blocks based on queries to show relationship between patent portfolios on graph mode (U.S. 2011/0246473 A1). A combination of the first category with the second category is given in U.S. Pat. No. 8,504,560 B2.

The third category uses search criteria based on regular expression and querying language such as Boolean expressions to search for relevant matches (U.S. 2013/0198182 A1) and to compare a target sequence and a sequence stored in a database. A conjunction method of comparison between claims in different patents matched against a database is described in U.S. 2011/0179022 A1.

The fourth category is to use an ontology to categorize patents is used in (U.S. 2013/0086070 A1; U.S. 2010/0131513 A1; U.S. 2013/0086045 A1; U.S. 2013/0086047 A1).

A fifth category creates ontologies automatically by using data. The ontology based method of creating data starts by first creating a lexical graph, then prominent terms are targeted and finally clustering is performed on the lexical graph (U.S. Pat. No. 8,620,964).

The shortcomings of the prior art is that it is either to restrictive such as using pre-established generic fields such as quantifying company name occurrences or inventors name frequency to gather into classes. On the other extreme there are processes where allow too much liberty (using Boolean operators) where the person looking for search matches requires to learn the workings of a good query to have successful matches. Other approaches such as statistical methods account for word occurrences, co-occurrences and mathematical formalism to carry out the search. These methods fall short because they do not exploit semantic relationships and structure of the patent document. No previous method explores the possibility of narrative to narrative comparison using graph theory.

SUMMARY OF THE INVENTION

An object of the present disclosure is to provide a method for creating computer representations of structural and functional elements in patent documents. The structural and functional representations are used to determine relative closeness of a patent, patent submission or existing product against the previous art in the form of structural and functional elements of other existing patent narratives that conform to a given structure.

Further, another object of the present invention is to provide a method for deriving a way to determine the novelty obviousness and correctness of the narrative of a patent submission with regard to the existing previous art.

Yet another object of the present invention is to provide a method for creating computer representations of structural and functional elements in patent documents further comprising: semantic relationships by exploiting the semi structured elements of the patent document to determine structural elements by parsing the body of the patent by searching descriptive elements within the narrative to form the nodes of the graph that are stored in an adjacency matrix or adjacency lists.

Yet another object of the present invention is to provide a method for creating computer representations of structural and functional elements in patent documents further comprising: semantic relationships by exploiting the semi structured elements of the patent document to determine structural elements by parsing the body of the patent by searching descriptive elements within the narrative to form the edges of the graph that are stored in an adjacency matrix or adjacency lists.

Another object of the present invention is to provide a method for creating computer representations of structural and functional elements in patent documents further comprising: parsing the document using parsing techniques to determine standard sections of the patent header information background of the invention, brief description of drawings, detailed description, and a claims section as well as non-standard sections of the document using previous patent patterns encoded into the parsing of the patent document.

The invention itself, both as to its configuration and its mode of operation will be best understood, and additional objects and advantages thereof will become apparent, by the following detailed description of a preferred embodiment taken in conjunction with the accompanying drawings.

When the word "invention" is used in this specification, the word "invention" includes "inventions", that is, the plural of "invention". By stating "invention", the Applicant does not in any way admit that the present application does not include more the one patentable and non-obviously distinct invention and Applicant maintains that the present application may include more than one patentably and non-obviously distinct invention. The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The following drawings should be read with reference to the detailed description. Like numbers refer to like elements. The drawings, which are not necessarily to scale, illustratively depict embodiments of the present invention and are not intended to limit the scope of the invention.

DESCRIPTION OF THE PREFERRED EMBODIMENT

The embodiments of the invention disclosed herein may be implemented, through the use of general-programming languages (such as C or C++). The program code can be disposed in any known computer-readable medium including semiconductor, magnetic disk, or optical disk (such as CD-ROM, DVD-ROM). As such, the code can be transmitted over communication networks including the Internet.

In the present disclosure, the terms "computer program", "computer program medium" and "computer-usable medium" are used to generally refer to media such as a removable storage unit or a hard disk drive. Computer program medium and computer-usable medium can also refer to memories, such as system memory and graphics memory which can be memory semiconductors (e.g., DRAMs, etc.). These products are examples of how to provide software to a computer system.

The embodiments are also directed to computer products comprising software stored on any computer-usable medium. Such software, when executed in one or more data processing devices, causes a data processing device(s) to operate as described herein or, allows for the synthesis and/or manufacture of computing devices (e.g., ASICs, or processors) to perform embodiments described herein. Embodiments employ any computer-usable or -readable medium, and any computer-usable or -readable storage medium known now or in the future. Examples of computer-usable or computer-readable mediums may include, but are not limited to, primary storage devices (e.g., any type of random access memory or read-only memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

The present disclosure provides an example embodiment for a method and system of extracting patent features for comparison to determine to determine similarities, novelty of the invention and non-obviousness relation between relevant art and the invention.

Primarily an invention is physically described as an invention document in a tangible medium, such as searchable data/document medium. The invention comprises several distinctive elements such as structure, compounds, steps, material and other significant features. Further a search for documents related to the subject matter of the invention is performed using computer programs or personal dedicated to complete the search based on the invention description. Different search methods may apply during the search process. After the search is completed the relevant art is selected. The relevant art comprises preferably searchable data, such as body, claims, description and background of the relevant art.

Once the selected relevant art, more particularly the searchable data and the invention description, more particularly the invention searchable data is stored in a computer program medium the method and system for extracting patent features, to determine similarities with relevant art, novelty of the invention and non-obviousness relation between relevant art and the invention is performed.

Figure 1:
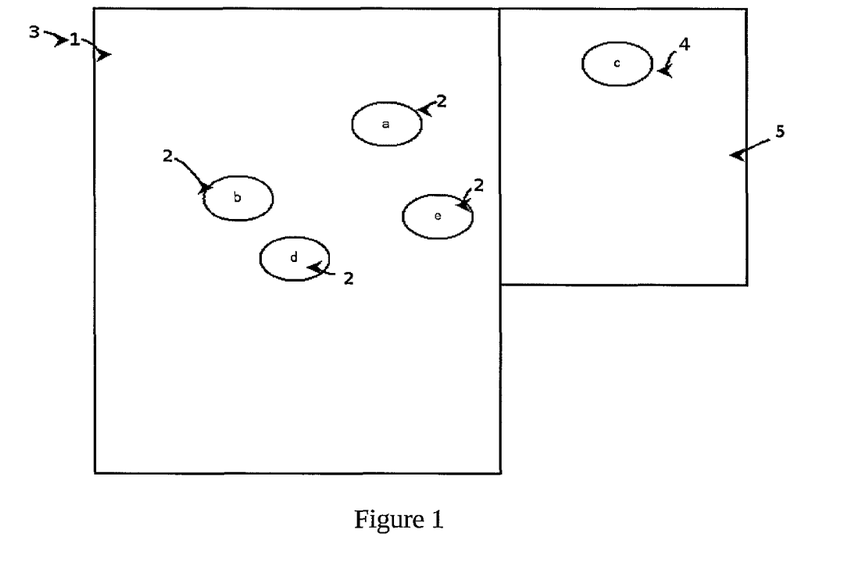
FIG. 1 shows a conceptual representation of ideas in a graph format on a conceptual plane that serves to illustrate the underlying concepts that will be reduced to a system and method of patent analysis.

For example, FIG. 1 shows conceptual representations 3 of the similarities between the invention and relevant art, the novelty of the invention and obviousness may be represented by using squares. A first set of elements 2 from the invention are grouped in a first conceptual representation 1 represented by a first square. The first square represents similitudes between the relevant art and the invention, wherein said invention includes but is not limited to a device, method, process, composition and/or structure detailed or describe in a digital manner or by means of a searchable data. Further, pluralities of similar elements between said relevant art and said invention are extracted from said searchable data, wherein said process of extraction is defined through a set of instructions. The elements include but are not limit to a compound, structure, temperature, particular step, material and others significant element, wherein said significant element can be represented as a node element 2 of a graph in the conceptual representation plane. These node elements 2 are usually introduced into the conceptual representations 3 as elements that have a specific numbering that is usually shown in the relevant art drawings and in the narrative of the relevant art body description. During the parsing process, at least some different elements 4 result from the comparison between the relevant art and the invention. The different elements 4 are part of an invention 1 but lies in a different conceptual area 5 of knowledge that the relevant art is familiarized with.

Figure 2:
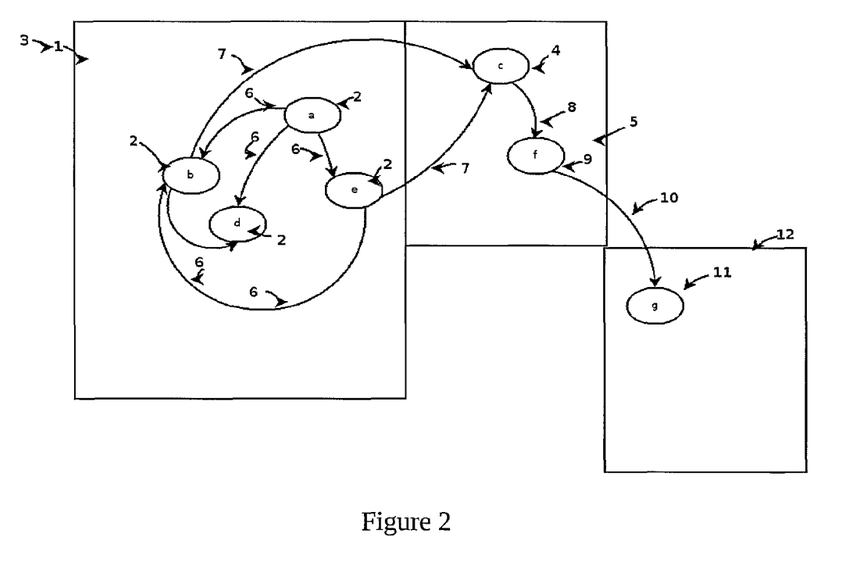
FIG. 2 shows a graphical representation of what an inventor has to do in the narrative of a patent document which is to provide known relationships of elements within the document.

FIG. 2 shows a graphical representation of what an inventor has to do in the narrative of a patent document which is to provide known relationships of the elements represented as node element 2. These node elements 2 joined together into a narrative by the use of words such as verbs, conjunctions, prepositions, etc., that can be represented by a relationship 6 which is shown in the graph structure as an edge. This relationship can be for example of an "is-a" relationship which provides a descriptive relationships between node elements 2. An alternate description of a relationship 6 can be of an "functions-as" relationship described by a verb or by other relevant relationship described by another part of searchable data. These descriptive and functional relationships can be analyzed in a combined graph structure or separate graph structure depending on the number of nodes elements 2 and relationships 6 in a relevant art document. A new conceptual representation 7 can be drawn from an element 2 to an element 4 which lies in a second conceptual representation area 5 which represents a new idea domain or novelty. The element 4 may also be linked to a second different element 9 through a relationship 8 which lies on the second conceptual representation area 5 but does not have any link to first conceptual representation 1. The second different element 9 can also be connected through a relationship 10 to a node 11 which would lie on conceptual representations 3 which would still be another distinct or more particularly a third conceptual representation area 12. The jumps from one conceptual representation to another, the edges that linked them with specific relations and functions, and the radius of the graph will determine the scope of the invention. As the relationships 7 move from the first conceptual representation 1, which is the scope of the relevant art, to a different or second conceptual representation area 5, which is outside the scope of the relevant art, this represents a new domain that can be considered new subject matter within that domain. As the distance from first conceptual representation 1 is increased by a relationship 8, element 9, relationship 10 and a node 11 the content of the second conceptual representation 5 and a third conceptual representation 12 becomes less obvious to someone skilled in the art. The number of nodes 4, 9 falling outside the previous art would represent the novelty while the distance made by relationships would represent the non-obviousness.

The graph structure represented by node elements 2 and relationship 6 on the first conceptual representation 1 have useful analytic properties such as frequency of occurrence in a document and can have a high "in degree" and "out-degree" of occurrence of the edges. This high frequency of occurrences can be a possible measure of centrality in a relevant art document and can help in clarifying classifications of the invention and patent documents. These can then be compared to terms in the claims to determine claim structure appropriateness. Other measures could include providing weights to the node elements 2 and relationship 6 represented by the edges of a graph into a combined scoring for the node elements 2 of the graph. The weight for the node elements and relationship is accomplished by different methods, such as probability programs.

Figure 3:
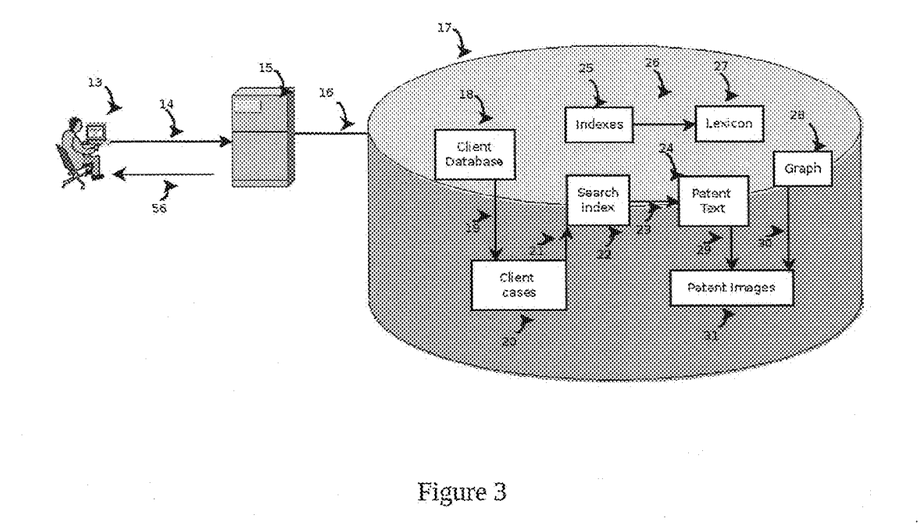
FIG. 3 shows the actual system that implements the analysis of the concepts presented in perform of FIG. 1 and FIG. 2.

FIG. 3 shows the actual system to perform the analysis of FIG. 1 and FIG. 2. The system is accessed through a computer terminal 13 comprising a computer-usable medium that sends a query to a processing unit 15 of the invention document. The processing unit 15 is connected through a communications channel 16 with the database 17. The database 17 contains a client database 18 that stores information about the individuals that submit information to the system. The information pertaining to each individual case is stored in the client cases database 20. A relation 19 links the information from the individuals stored in the client database 18 with their cases stored in the client cases database 20. The client cases 20 contains previous queries 21 made to the search index that were relevant to the case made on a search index 22. The search index provides rapid access to a searchable document, such as a relevant art text repository 24 through an indexing process 23. The database 17 contains an index 25 that provide a reference 26 to the lexicon and semantic repository 27 which is used in the part of speech tagging of relevant art text repository 24. A graph storage 29 contains extracted graphs that were processed using lexicon and semantic repository 27 on relevant art text repository 24. The relevant art text 25 contains references 29 to a repository of relevant art images 31. A graph repository 28 stores the graph information and also stores of the processed relevant art. The graph repository 28 also has stored references 30 to repository of relevant art/patent images 31.

Figure 4:
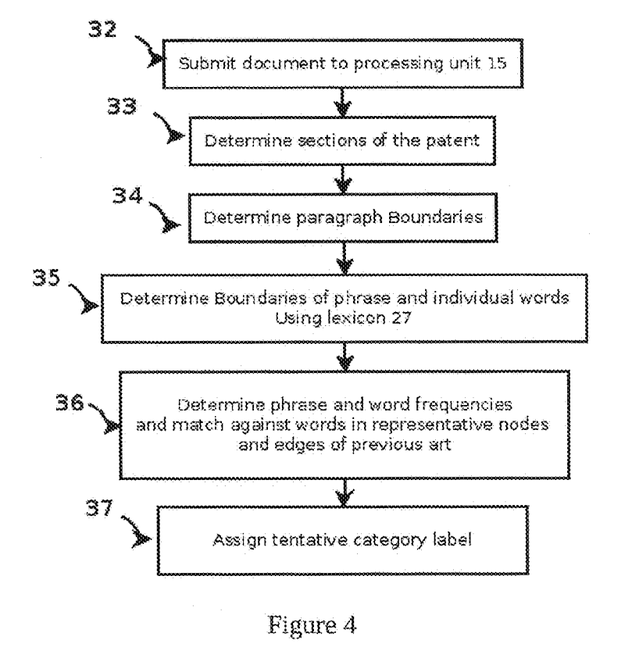
FIG. 4 shows the process of assigning preliminary category labels to patent document.

FIG. 4 shows the initial flow of document submission to the processing unit 15 through terminal 13 of the proposed system in a step 32. The process first determines the sections of the invention document in a step 33. Step also checks that the submitted document complies with standard section of an patent application document such as containing a background of invention section, claims section, and so on. The step 33 determines the background of invention section. The background of invention section is then passed to a step 34 that determines the paragraph boundaries in the background of invention section. Each of the paragraphs determined in step 34 are then passed to a step 35 that determines phrase and word boundaries within the paragraphs using the lexicon and semantic repository 27. The words and phrase identified on step 35 are used on a step 36 to match edges and nodes extracted from the previous or relevant art in categories which is then matched against the term frequencies of the submission. A final step of FIG. 4 is a step 37 which assigns a tentative category to the submitted invention based on step 36.

Figure 5:
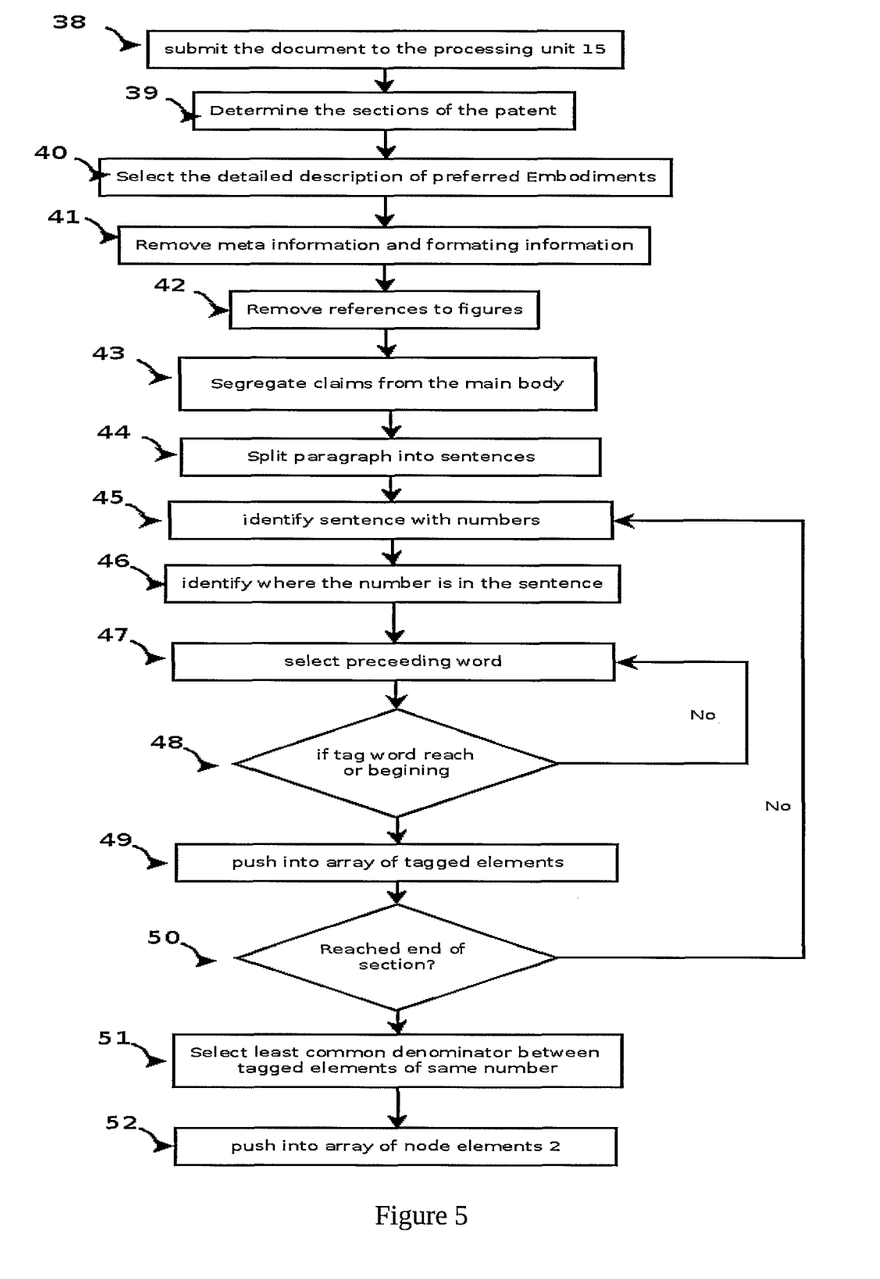
FIG. 5 shows the steps to get the node elements from the patent submission or existing patent document.

FIG. 5 shows the steps to get the node elements 2 from the description of preferred embodiment section. The process begins with a step 38 which is the document submission to the processing unit 15. The document to be processed in step 38 may be a new document submission or an existing patent in the relevant art text repository 24. A step 39 is designed to segregate the sections of the patent submitted in step 38 and then a step 40 selects from the sections identified in step 39 the description of preferred embodiment. A step 41 removes meta information such as xml, html or document processor information or other format description tags that are format dependent from the processed document of step 40. A step 42 removes numbers from the document processed in step 41 that make reference to figures within the description of preferred embodiment section. The step 42 is followed by step 43 that extracts the claims section from the description of preferred embodiment section. A step 44 continues the processing of step 43 by splitting each paragraph of the description of preferred embodiment section and the claims section.

The split paragraphs of step 44 are then processed by a step 45 that splits each paragraph into sentences and identifies the sentences that contains numbers in the sentences. These numbers represents the patent elements that correspond to elements in figures that are important to the narrative of the patent. The sentences identified with numbers in step 45 are then selected for further processing in step 46 that identifies the where the numbers are located within the sentence. The placement of numbers in step 46 then goes into a loop described by a step 47 and a step 48. Step 47 selects the word preceding the number and step 48 decides if the tag words are reached or the beginning of the sentence is reached. If step 48 decides that the tag word has not been reached or the beginning of the sentence then it redirects to step 47. In a typical embodiment the tag words can be words such as an, a, at, the, and said which mark the introduction of a new element. A step 49 pushes into a memory array of processing unit 15 the sentence segments that were identified in step 47 and 48. The process carried out in steps 45 through 49 are repeated until a step 50 determines that all sentences have been processed. Once all the selected numbered elements are in the array of step 49 a step 51 selects the least common denominator of each element that has the same number. This selected sentence fragment of step 51 will then be the node element 2 and the patent element that is also described in the figures and narrative. The selected least common denominator of step 51 will then be pushed into a memory array of processing unit 15 by a step 52.

Figure 6:
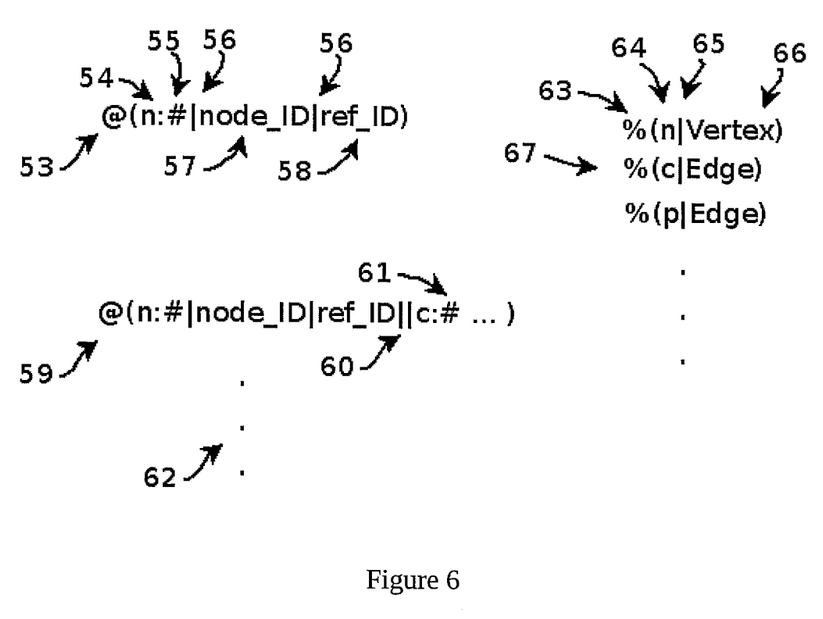
FIG. 6 shows storage format of the processed nodes and edges

FIG. 6 shows node elements 2 in its structural representation as a storage format 53 that results from step 52. Storage format 53 can remain in memory of processing unit 15 or be stored in graph repository 28. The storage format 53 contains a node reference entry identifier 54 that identifies the element as a node and a referring number 55. A separating element 56 segregates the node reference entry identifier 54 from a node identifier 57. The node identifier 57 in turn is also separated by separating element 56 from the reference id 58. Reference id 58 links storage format 53 of graph repository 28 with repository of patent images 31. A storage format 59 has the same elements as storage format 53 and in addition contains a section separating element 60 that separate the elements of format 53 with different section 61 the section contains the same elements of format 53. The storage format 59 is stored in graph repository 28 as distinct entries 62. The specific entry identifier 54 are described by a list of entries 67. List 67 describes each entry 54 by an individual list entry 63. List entry 63 has a key identifier 64. Entry 64 has different identifiers which in a typical embodiment can mean "c" for conjunction "p" for preposition and so on for each part of speech and "n" for a node element 2.

Figure 7:
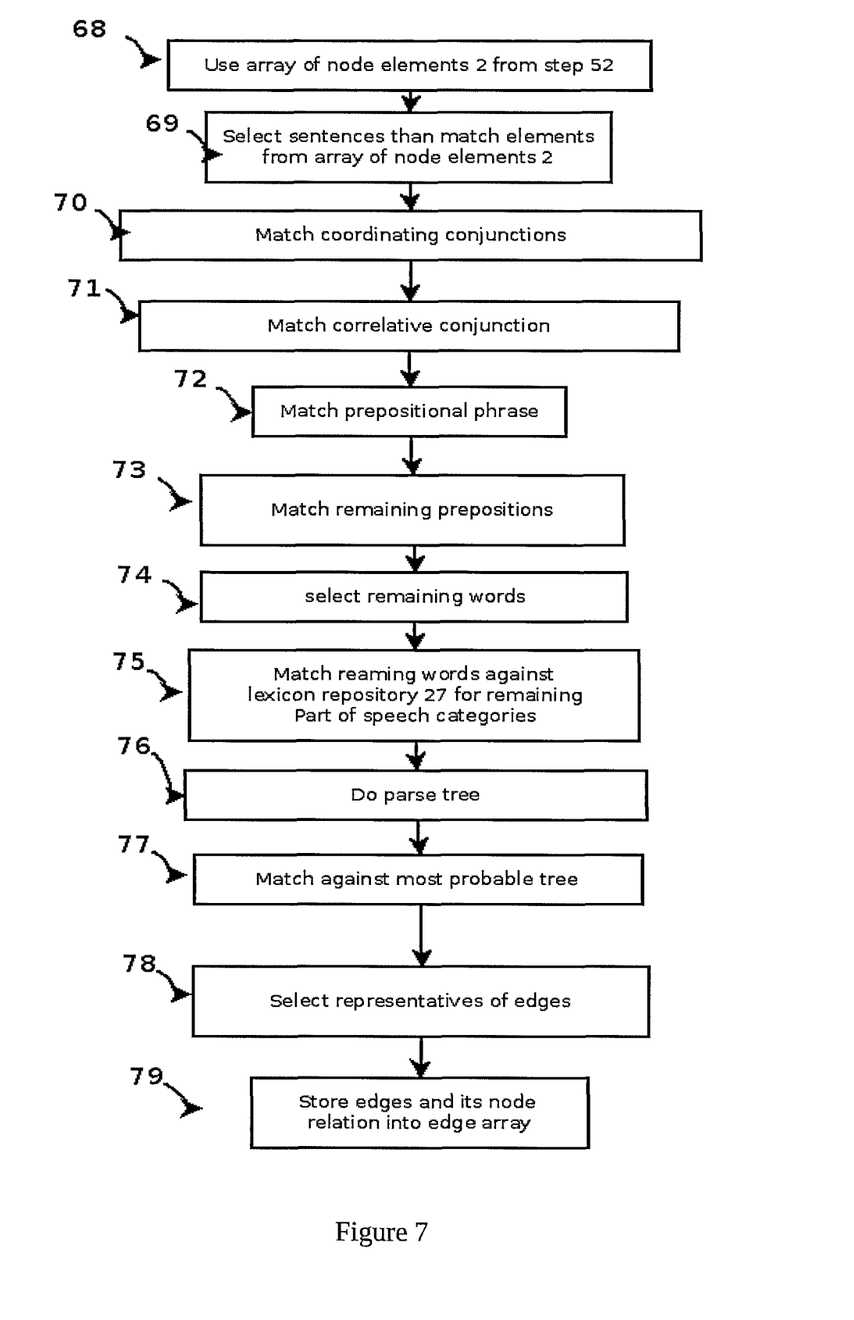
FIG. 7. shows the process of extracting edges from the patent submission or patent document.

FIG. 7 shows the process of determining edge elements. A step 68 selects the array of nodes elements of step 52. The step 68 is followed by a step 69 that matches node elements 2 with the sentences in which they occur. The matching sentences of step 69 are passed to a step 70 that identifies coordinating conjunctions within the sentences. The placement of coordinating conjunctions allows for set operations to be carried out on either nodes or edges. The step 70 is followed by a step 71 that matches correlative conjunctions on the sentences of step 69. The use of correlative conjunctions allows for additional set operations and conditionals to be applied to nodes and edges. A step 72 follows step 71 where the objective of step 72 is to match prepositional phrase elements within the sentences of step 69. The prepositional phrases allows for the identification of spatial and temporal relationship and placement of structural characteristics of the elements. Step 72 is complemented by step 73 that matches the remaining prepositions of the sentences of step 69. Step 73 gives way to a step 74 that matches the remaining parts of speech such as nouns and adjectives, articles, etc. The remaining words that are not matched are then flagged for manual intervention. The elements identified in steps 70 through 75 are then subjected to a step 76 that does a parse tree candidates of the sentence syntax structure. The parse trees identified in step 76 are then analyzed in a step 77 to identify the parse tree that represents the most probable sentence syntactic structure. The sentence structure of step 77 will provide prepositions, verbs and adjectives which can then be used in a step 78 to determine the edges that will be used to link the node elements 2. A step 79 will store the edges of step 78 in graph repository 28. Alternate embodiments to edge assignment include scoring elements, special tags to sort important from trivial elements among others.

Figure 8:
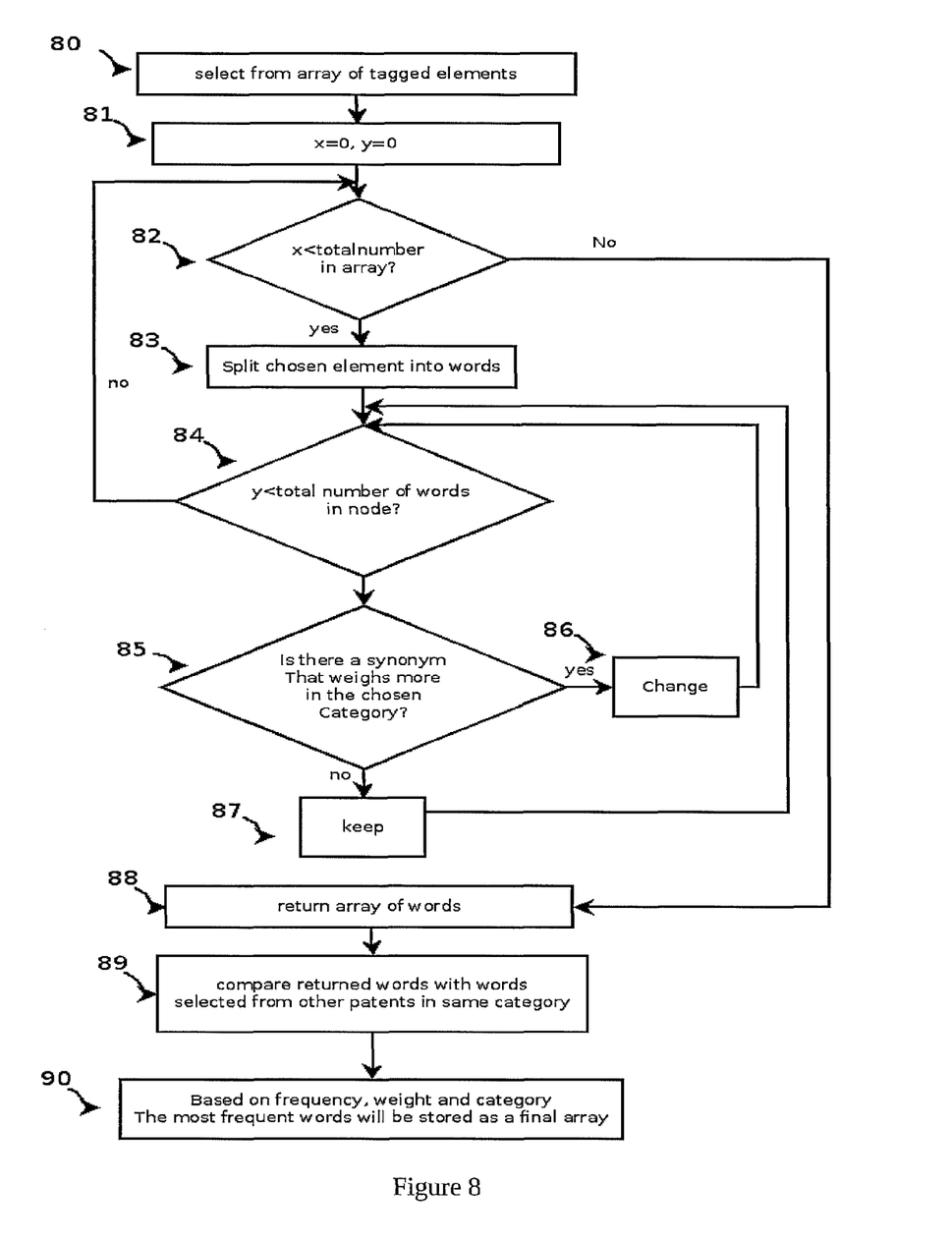
FIG. 8 shows the process of normalizing word elements from nodes and edges

FIG. 8 shows the normalization of word elements of nodes and edges for proper comparison between invention documents and patent which is one of the relevant art documents. The process starts with a step 80 that selects of tagged elements consisting of nodes elements of step 52 and edge elements of step 78. The step 80 is followed by a step 81 that initializes the variables x that will keep track of the number of nodes and edges and a variable y that will keep track of the number of words in each node and edge. The step 82 will compare if the current element is the end of the array of nodes and edges of step 80. If the total x is less than the total number of nodes and edges the step 82 will give way to a step 83 which will take the current element and split the node or edge into individual words. Each of the individual words of step 83 are then assigned a value and then taken each one step at a time controlled by a condition 84 which will determine if all the elements have been analyzed. If all the elements have been analyzed the condition 84 will move the routine to step 82. While all the elements have not been analyzed the step 84 will pass each individual word to a step 84 which will compare the word against category entry in the lexicon and semantic repository 27 to see if there is a synonym entry for that word in that specific category. If the word is in the category step 85 will proceed to a step 86 which will change the word to the synonym entry for that category and then redirect the flow to step 84. If there is no synonym word the step 85 will give way to a step 87 that keeps the word and then redirects the flow of the process to step 84. If the total x is greater than the total number of nodes and edges the step 82 will move to step 88 that returns the array of words. The array of words in step 89 are then compared in a step 89 with words selected from other patents in the same category and in a step 90 depending on the frequency are assigned a corresponding weight in the category of form or function. Step 90 also stores the results in the array. The steps carried out in FIG. 8 also represent a subprocess carried out in step 36 and step 37.

Figure 9:
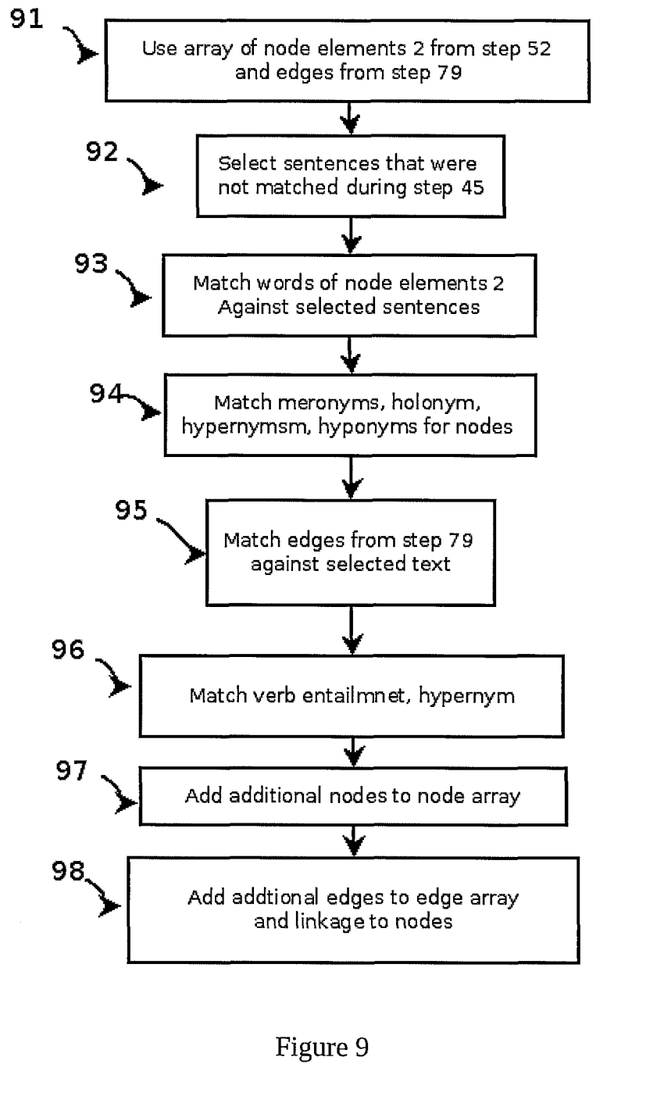
FIG. 9 shows additional discrimination in remaining text of the patent submission or patent document.

FIG. 9 shows additional discrimination in remaining additional text. The Step 91 selects the array of node elements 2 from step 52 and edges from step 79. The nodes from step 91 are then used to discriminate the sentences that do not include nodes in the sentence body and therefore have not been processed. The sentences of step 92 are then passed to a step 93 which extracts individual words from the nodes for matching against the text of the selected sentences of step 92. The step 93 is followed by a step 94 which will then try synonyms of node elements against the words of selected sentences of step 92. The step 94 will follow with a step 95 which then uses the words from sentences of step 92 and compare them against selected edges from step 79 for a match. The step 95 will give way to a step 96 which will try to match edges synonyms against the words of selected sentences of step 92. The extracted matches of prepositions or other meaningful text that have been identified in the relationships extracted in steps 93 to 96 that are not in the existing arrays will then be added as nodes to the array of node elements 2 or edge array of step 79.

Figure 10:
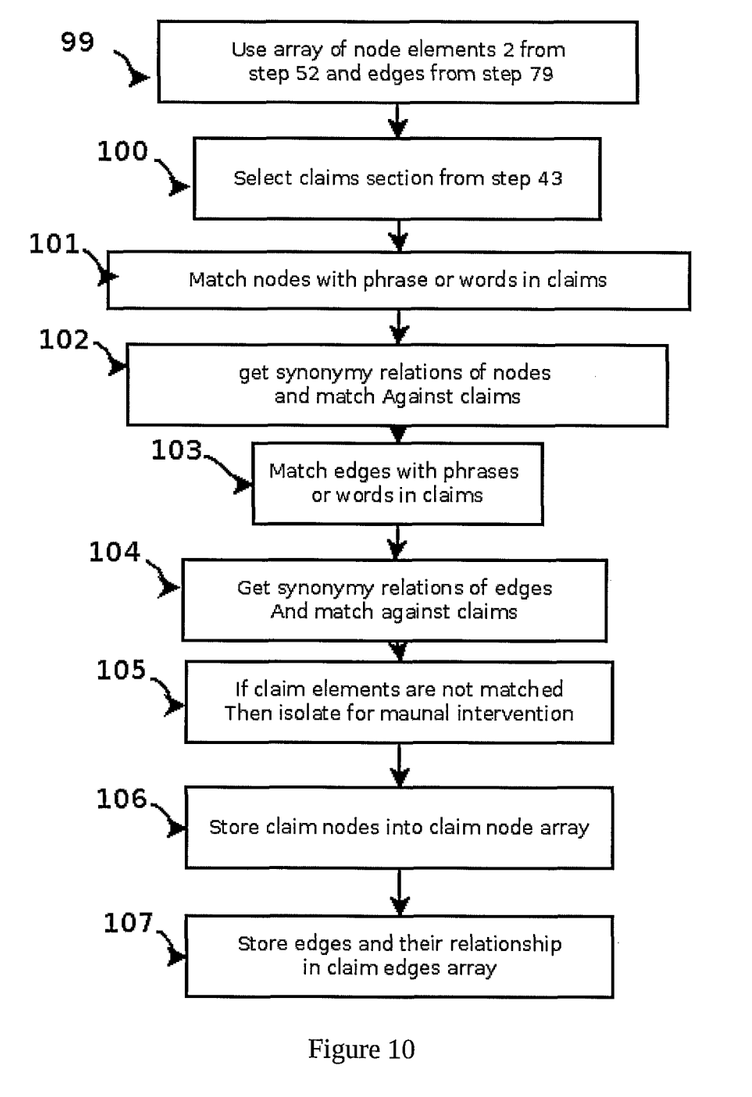
FIG. 10 shows the process of claim analysis the detailed description section.

FIG. 10 shows the process of claim analysis the detailed description section. The step 99 selects the array of node elements 2 and edges from step 79. The step 99 is followed by step 100 that selects the claims section from the invention document submission or patent document narrative. The selected claims section from step 100 is then processed in step 101 to match phrases or words in the claims narrative. The matched phrases or words of step 101 are then used in step 102 alongside array of node elements 2 to determine an exact match or synonymy between them. The step 102 is followed by step 103 that does exact matching of edges with words in claims section from step 100. The step 103 is followed by a step 104 that does synonym matching of edges with words in claims section from step 100. If claim elements are not matched by steps 101 through 104 then a step 105 isolates the claim elements for manual intervention. Extracted elements from steps 101 and steps 102 are then stored into claim node array in step 106. Extracted elements from steps 103 and steps 104 are then stored into edge array in step 107.

Figure 11:
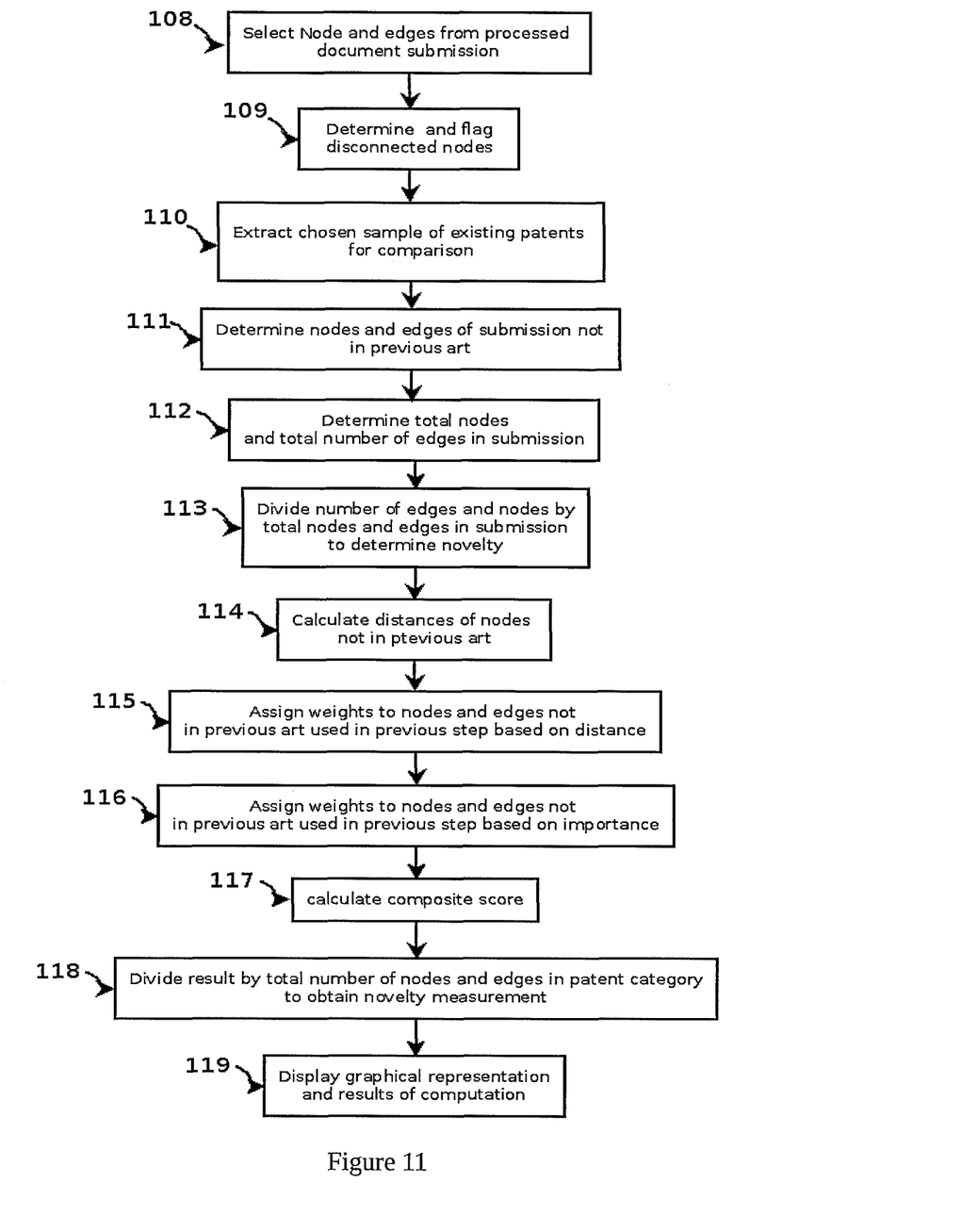
FIG. 11 shows processing to determine disconnected nodes, disconnected claims, novelty and non-obviousness of document against existing prior art

FIG. 11 shows the processing to determine disconnected nodes, disconnected claims, novelty and non obviousness of document against existing prior art. Step 108 selects the array of node elements 2 and edges from step 79 from the processed invention document submission. The step 108 is followed by a step 109 that determines by the edges from step 79 if there are any numbers of nodes that are disconnected and raises the flag for manual intervention. The disconnected node flag signifies that the invention document narrative is incomplete since all nodes must be connected to another node through either form or functional description. The step 109 is followed by step 110 that extracts the chosen samples of existing patents for comparison and makes an array of nodes 2 and an array of edges from step 79. Step 110 is followed by a step 111 where the corresponding array of nodes and array of edges for both the invention document submission and the existing patent documents are then compared to determine the nodes and edges from the document submission that are not part of the existing patent documents. Step 111 is followed by a step 112 that determines the total number of nodes and edges in the invention document submission. Step 113 takes the number of nodes and edges not in existing patents determined in step 111 and divides the number by the number of nodes and edges determined in step 112 to determine the novelty of the document submission. Step 113 is followed by a step 114 that calculates the distance of the nodes from the document submission that are not in the existing patents. The nodes and edges identified in step 114 are then assigned a weight in step 115 based on the distance assigned in step 114. Step 115 is followed by a step 116 that takes the nodes and edges identified in step 114 and then assigns a weight based on importance of the words. The importance score assigned in step 116 is based on a stored weight in lexicon and semantic repository 27. Step 117 derives a composite score from step 116 and 115. Step 118 takes the composite score from step 118 and divides it by the total number of nodes and edges in patent category to obtain a novelty measurement score. Step 118 is followed by a step 119 that displays the graphical representation of the analysis and the results of the computation.

Figure 12:
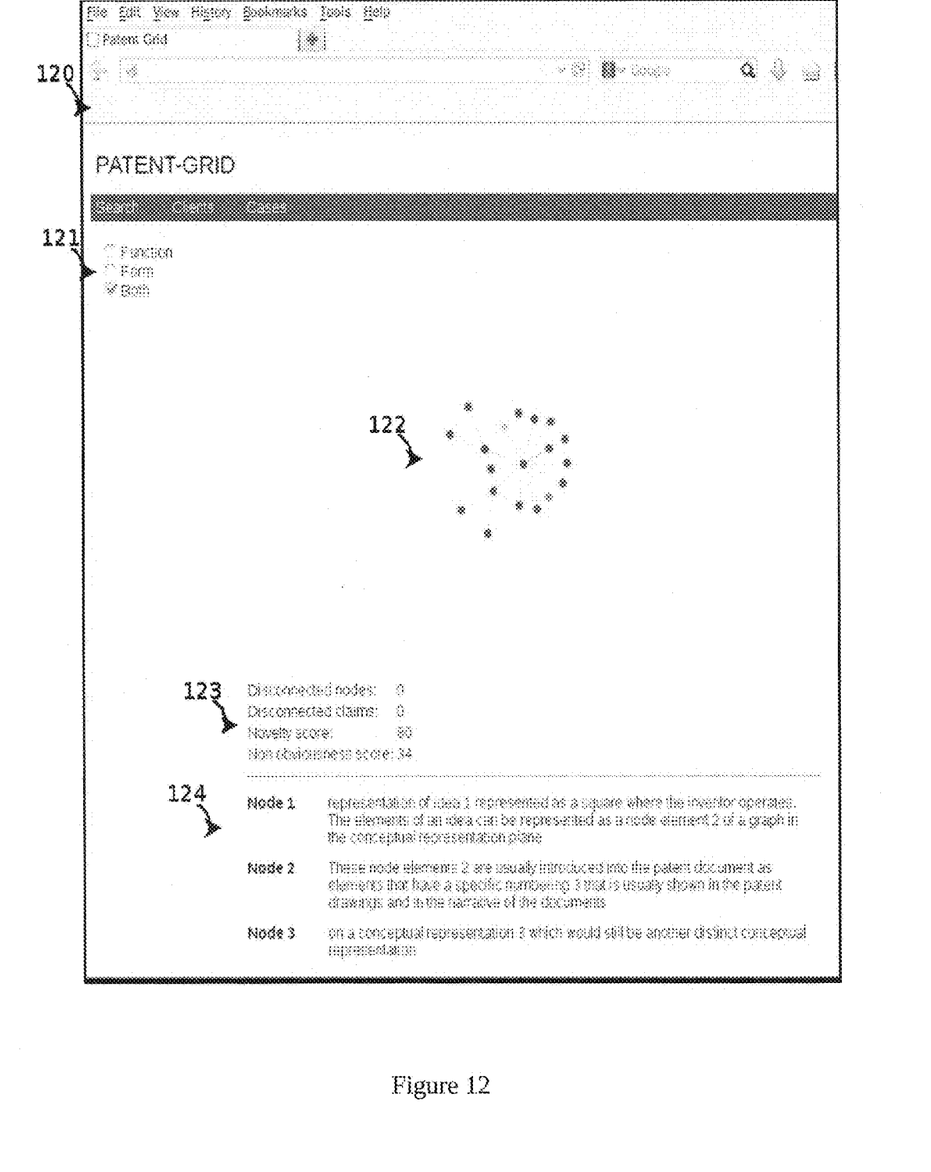
FIG. 12 shows a typical graphical interface of the proposed embodiments

FIG. 12 shows the graphical interface of step 119. The interface is composed of a graphical interface 120 that displays the information to the user. Graphical interface 120 presents the user with the option 121 of analysis of function, form or both. The option will control underlying presentation of the processing to just show edges and nodes connected by verbs and other elements that constitute function or adjectives and other parts of speech that represent form or both. The graphical interface 120 will display the graphical representation of the nodes and edges in a graph 122. The graphical interface 120 will have a statistics section 123 that will display relevant information of the invention document submission with regards to the relevant art. The graphical interface 120 will have a section 124 that will link the nodes and edges of graph 122 with the invention document submission fragments where the nodes and edges appear.

The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patentable distinguish any amended claims from any applied prior art.

What is claimed is:

1. A method for computer representations of structural elements and functional elements in a searchable invention documents and a searchable document represented by a graph composed of nodes and links as a computer program product embodied on a computer-readable medium, the method comprising:

accessing a computer terminal including a computer usable medium;

selecting a searchable invention documents using the computer terminal, wherein said searchable invention document comprises an invention body, wherein said invention body comprises an invention narrative, wherein said invention narrative includes a plurality of invention words and a plurality of invention phrases;

sending said searchable document to a processing unit;

verifying the searchable invention document;

accessing a database, wherein said database comprises at least one pre-stored document and an index context;

selecting at least one searchable document, wherein said at least one searchable document comprises at least a searchable first body, wherein said searchable first body includes a searchable narrative, wherein said searchable narrative comprises a claim preamble and a claim body, wherein said first body includes a body preamble and a body narrative;

parsing of the invention body, wherein the parsing of the invention body comprises the extraction of a plurality of invention element from said invention body, wherein plurality of invention element includes invention significant elements, wherein each invention significant element is identified as a first set of nodes for said invention body, wherein each first node from said first set of nodes comprises a first weight score;

wherein said parsing of the invention body further comprises extracting the invention element links between the invention significant elements;

parsing the at least one searchable first body, wherein parsing the at least searchable first body comprises the extraction of a plurality of searchable element from said searchable first body, wherein plurality of searchable first body include searchable significant elements, wherein each searchable significant element is identified as a second set of nodes for said searchable first body, wherein each second node from said second set of nodes comprises a second weight score;

determining related nodes from the first set of node with the second set of nodes;

determining non-related nodes from the first set of node with the second set of nodes;

matching related nodes;

determining connection between the searchable invention document and the searchable document based on the related nodes, non-related nodes and invention element links between related nodes, displaying at the computer terminal a graphical representation of the connection between the searchable invention document and the searchable document based on the related nodes, non-related nodes and invention element links between related nodes, displaying at the graphical representation a control option for underlying presentation of related nodes, non-related nodes and invention element links between related nodes, and selecting a particular area at a region of the graphical representation for receiving commands from a user input wherein said particular area comprises a plurality of additional parameters for the displaying relevant information related connection between the searchable invention document and the searchable document based on the related nodes, non-related nodes and invention element links between related nodes.

2. The method according to claim 1, comprising determining if the searchable invention document complies with pre-define document sections.

3. The method according to claim 2, wherein determining if the searchable invention document complies with pre-define document sections comprises parsing the invention document using parsing techniques to determine standard sections of the patent, wherein said standard sections comprises background of the invention, brief description of drawings, detailed description, and a claim section.

4. The method according to claim 1, wherein each invention significant element represents at least one word of said plurality of invention words an at least one phrase of said plurality of invention phrases.

5. The method according to claim 1, wherein each searchable significant element represents at least one word of a plurality of searchable words and at least one phrase of a plurality of searchable phrases.

6. The method according to claim 5 of generation of descriptive structures of the graph and its linkage to the narrative that are stored in an associative array further comprising parsing the sections of the patent document to determine the boundaries of the paragraph, phrases and individual words by exploiting structural elements in the form of keywords and format of the patent and forming the linkage between the paragraph, phrases and individual words and the generated weighted adjacency matrix or weighted adjacency list and degree matrix.

7. The method according to claim 1, wherein parsing searchable document to obtain a claim preamble from a claim narrative, wherein obtaining the claim preamble from the claim narrative comprises determining at least a first phrase boundaries within the claim by matching said first phrase boundary with the index context.

8. The method according to claim 1, comprising determining syntactic relationship, semantic relationship and metadata relationship by exploiting the semi structured elements of the searchable document to determine structural elements by parsing the searchable first body searching for descriptive elements within the searchable narrative to form the descriptive structures of the graph and its linkage to the searchable narrative that are stored in an associative array.

9. The method according to claim 1, comprising determining syntactic relationship, semantic relationship and metadata relationship by exploiting the semi structured elements of the searchable document to determine structural elements by parsing the searchable first body searching for descriptive elements within the searchable narrative to form the nodes of the graph that are stored in an associative array, weighted adjacency matrix or weighted adjacency list and degree matrix.

10. The method according to claim 1, comprising determining syntactic, semantic and metadata relationships by exploiting the semi structured elements of the searchable document to determine structural elements by parsing the searchable first body searching descriptive elements within the searchable narrative to form the edges of the graph that are stored in an associative array, weighted adjacency matrix or weighted adjacency list and degree matrix.

11. A system for computer representations of structural elements and functional elements in a searchable invention documents and a searchable document represented by a graph composed of nodes and links as a computer program product embodied on a computer-readable medium, the system comprising:
    circuitry configured to accessing a computer terminal including a computer usable medium;
    circuitry configured to selecting said searchable invention documents using the computer terminal, wherein said searchable invention document comprises an invention body, wherein said invention body comprises an invention narrative, wherein said invention narrative includes a plurality of invention words and a plurality of invention phrases;
    circuitry configured to sending said searchable document to a processing unit;
    circuitry configured to verifying the searchable invention document;
    circuitry configured to accessing a database, wherein said database comprises at least one pre-stored document and an index context;
    circuitry configured to selecting at least one searchable document, wherein said at least one searchable document comprises at least a searchable first body, wherein said searchable first body includes a searchable narrative, wherein said searchable narrative comprises a claim preamble and a claim body, wherein said first body includes a body preamble and a body narrative;
    circuitry configured for parsing of the invention body, wherein the parsing of the invention body comprises the extraction of a plurality of invention element from said invention body, wherein plurality of invention element includes invention significant elements, wherein each invention significant element is identified as a first set of nodes for said invention body, wherein each first node from said first set of nodes comprises a first weight score;
    wherein said circuitry configured for parsing of the invention body further comprises extracting the invention element links between the invention significant elements;
    circuitry configured for parsing the at least one searchable first body, wherein circuitry configured for parsing the at least searchable first body comprises the extraction of a plurality of searchable element from said searchable first body, wherein plurality of searchable first body include searchable significant elements, wherein each searchable significant element is identified as a second set of nodes for said searchable first body, wherein each second node from said second set of nodes comprises a second weight score;
    circuitry configured for determining related nodes from the first set of node with the second set of nodes;
    circuitry configured for determining non-related nodes from the first set of node with the second set of nodes;
    circuitry configured for matching related nodes;
    circuitry configured for determining connection between the searchable invention document and the searchable document based on the related nodes, non-related nodes and invention element links between related nodes,
    circuitry configured for displaying at the computer terminal a graphical representation of the connection between the searchable invention document and the searchable document based on the related nodes, non-related nodes and invention element links between related nodes,
    circuitry configured displaying at the graphical representation a control option for underlying presentation of related nodes, non-related nodes and invention element links between related nodes, and
    circuitry configured selecting a particular area at a region of the graphical representation for receiving commands from a user input wherein said particular area comprises a plurality of additional parameters for the displaying relevant information related connection between the searchable invention document and the searchable document based on the related nodes, non-related nodes and invention element links between related nodes.

12. The system according to claim 11, comprising circuitry configured for determining if the searchable invention document complies with pre-define document sections.

13. The system according to claim 12, wherein the circuitry configured for determining if the searchable invention document complies with pre-define document sections comprises parsing the invention document using parsing techniques to determine standard sections of the patent, wherein said standard sections comprises background of the invention, brief description of drawings, detailed description, and a claim section.

14. The system according to claim 11, wherein each invention significant element represents at least one word of said plurality of invention words an at least one phrase of said plurality of invention phrases.

15. The system according to claim 11, wherein each searchable significant element represents at least one word of a plurality of searchable words and at least one phrase of a plurality of searchable phrases.

16. The system according to claim 11, circuitry configured for parsing searchable document to obtain a claim preamble from a claim narrative, wherein obtaining the claim preamble from the claim narrative comprises determining at least a first phrase boundaries within the claim by matching said first phrase boundary with the index context.

17. The system according to claim 11, comprising circuitry configured for determining syntactic relationship, semantic relationship and metadata relationship by exploiting the semi structured elements of the searchable document to determine structural elements by parsing the searchable first body searching for descriptive elements within the searchable narrative to form the descriptive structures of the graph and its linkage to the searchable narrative that are stored in an associative array.

18. The system according to claim 11, comprising circuitry configured for determining syntactic relationship, semantic relationship and metadata relationship by exploiting the semi structured elements of the searchable document to determine structural elements by parsing the searchable first body searching for descriptive elements within the searchable narrative to form the nodes of the graph that are stored in an associative array, weighted adjacency matrix or weighted adjacency list and degree matrix.

19. The system according to claim 11, comprising circuitry configured for determining syntactic, semantic and metadata relationships by exploiting the semi structured elements of the searchable document to determine structural elements by parsing the searchable first body searching descriptive elements within the searchable narrative to form the edges of the graph that are stored in an associative array, weighted adjacency matrix or weighted adjacency list and degree matrix.

20. The system according to claim 11 circuitry configured for generating a descriptive structures of a graph and its linkage to the searchable narrative that are stored in an associative array comprising parsing the sections of the searchable document to determine the boundaries of paragraphs, said plurality of phrases and said plurality of words, wherein parsing the sections of the searchable document to determine the boundaries of the paragraphs, said plurality of phrases and said plurality of words comprises exploiting structural elements in the form of keywords and format of the searchable document and forming the linkage between the paragraph, phrases and individual words and the generated weighted adjacency matrix or weighted adjacency list and degree matrix.

* * * * *